INVENTORS
WILBER E. SANDERS, JR.
FREDERICK R. FISCHER.
ROBERT L. SKINNER.
ALFRED WESSTROM.
EUGENE J. ZILKOWSKI.

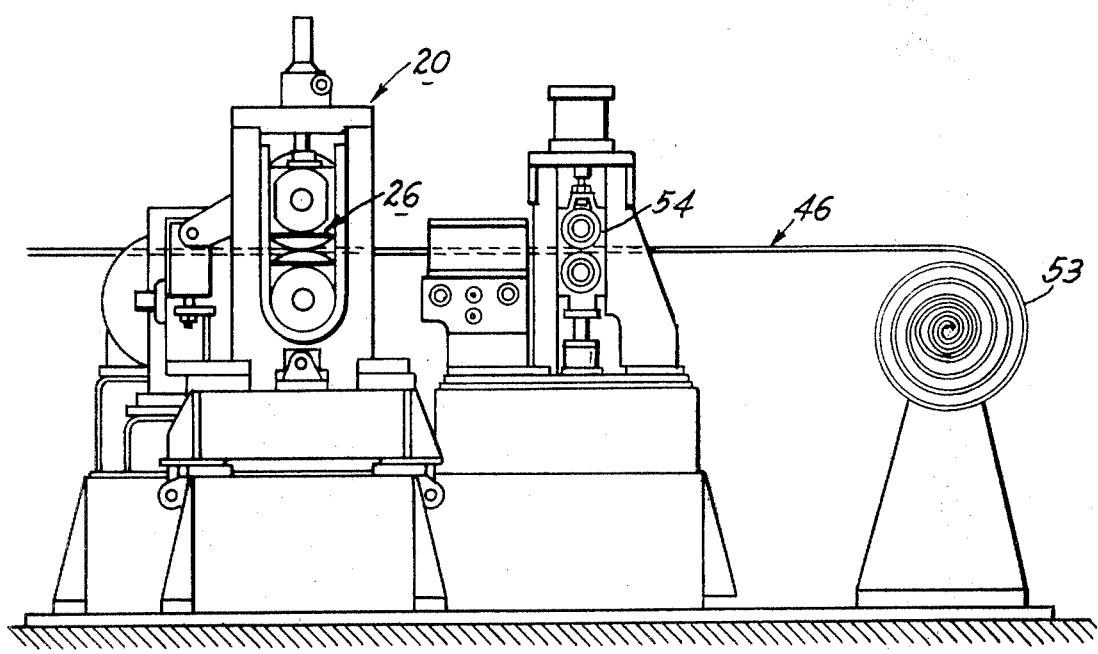
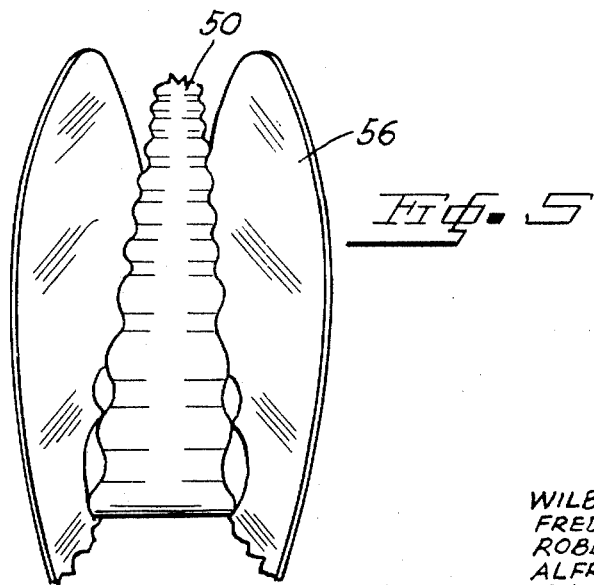

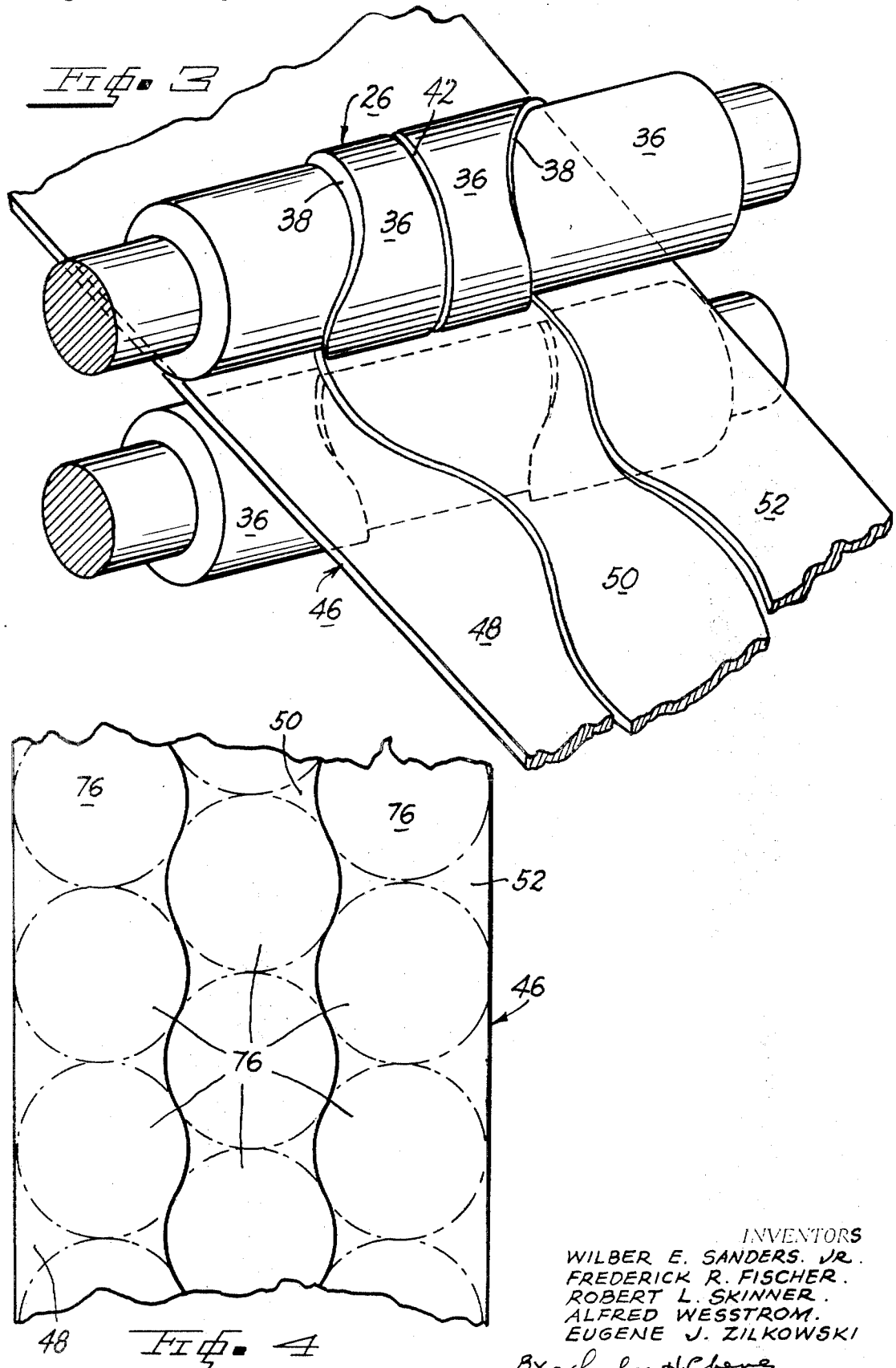

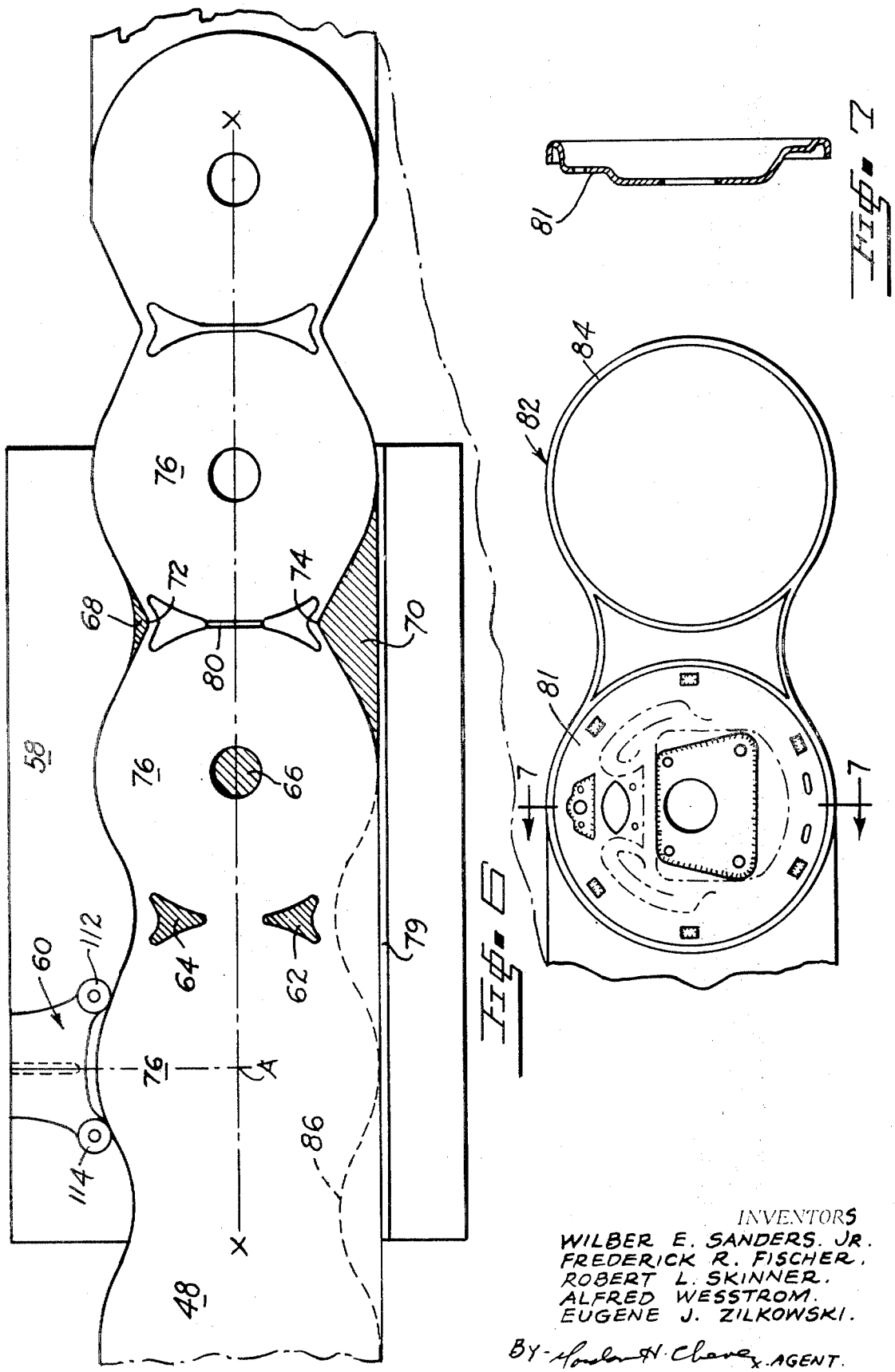

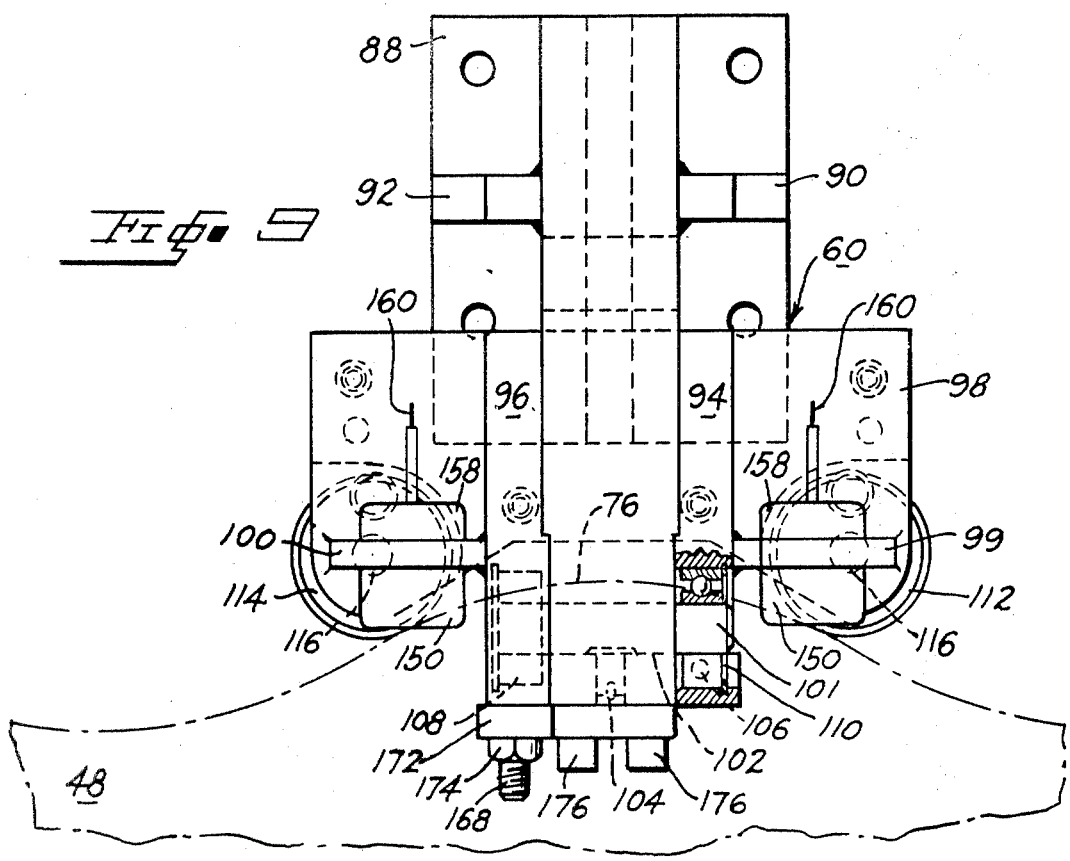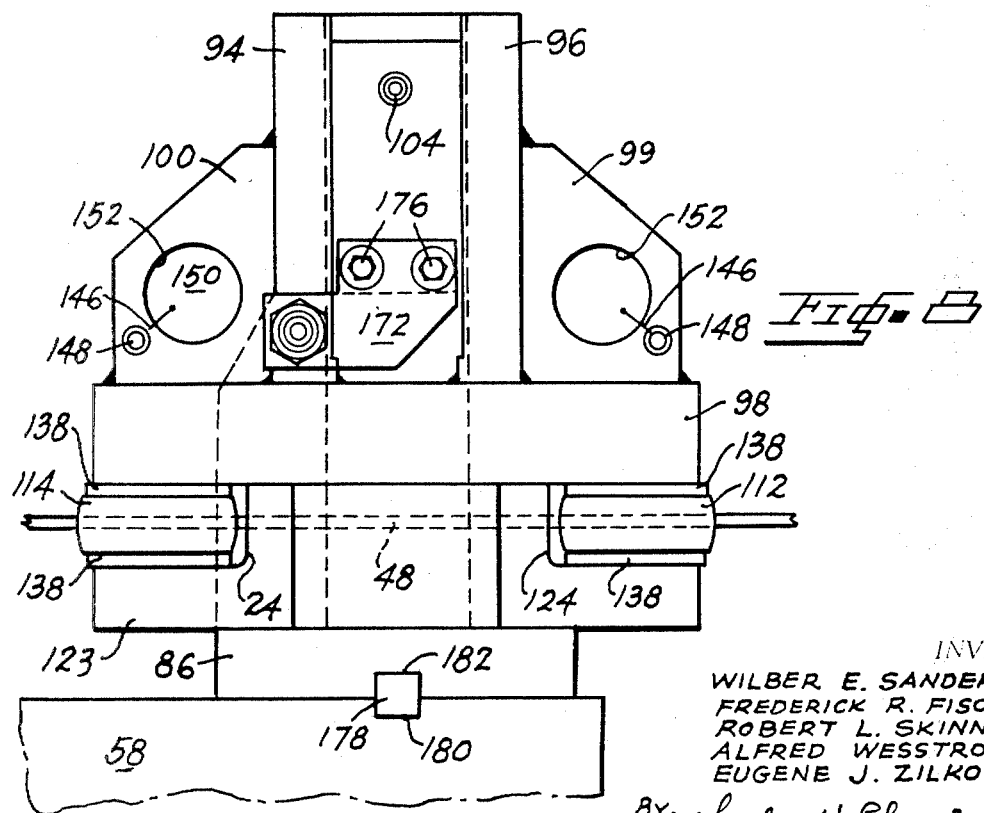

United States Patent Office 3,517,532
Patented June 30, 1970

3,517,532
APPARATUS FOR SLITTING SHEET METAL AND METHOD OF FORMING CIRCULAR MEMBERS THEREFROM
Eugene J. Zilkowsky, Wilber E. Sanders, Jr., Frederick R. Fischer, Robert L. Skinner, and Alfred Wesstrom, South Bend, Ind., assignors to The Bendix Corporation, a corporation of Delaware
Original application Sept. 27, 1965, Ser. No. 490,190, now Patent No. 3,388,582, dated June 18, 1968. Divided and this application Mar. 8, 1968, Ser. No. 711,766
Int. Cl. B21c 51/00
U.S. Cl. 72—31                                    4 Claims

ABSTRACT OF THE DISCLOSURE

Apparataus for and method of slitting a continuous sheet of relatively heavy gauge sheet metal into a plurality of narrower strips having longitudinally extending serpentine edge portions from which tangential circular lanks partially outlined by the serpentine edge portions are stamped to thereby maximize the number of blanks obtainable from a given area of sheet metal.

---

This application is a division of our copending application Ser. No. 490,190, filed Sept. 27, 1965, now Pat No. 3,388,582.

In backing plate stamping operations of the above mentioned type, it has been a practice to purchase coils of sheet metal having a width substantially equal to the diameter of the blanks stamped therefrom from which the brake backing plates are formed. The wasted remaining sheet metal, i.e., the area between the discs stamped therefrom, is substantial and does not therefore present economical use of the available sheet metal.

Referring to U.S. Pat No. 1,656,794, issued Jan. 17, 1928, to R. W. Messenger and Pat. No. 2,345,882, issued Apr. 4, 1944, to P. E. Pearson, it is noted that various methods have been proposed for reducing waste in cutting circular can ends from relatively thin sheet metal such as thin plate. However, such methods relate to shearing of metal or other material in flat form and are not feasible in connection with sheet metal in continuous strip form.

It is therefore an object of the present invention to provide apparatus for slitting a relatively wide continuous strip of relatively heavy gauge sheet metal into a plurality of narrower strips having longitudinally extending serpentine edge portions which partially defined the outline of circular members formed from said strips.

It is an object of the present invention to provide a method of stamping circular blanks from a strip of sheet metal with a minimum amount of waste.

It is an important object of the present invention to provide apparatus for slitting a continuous strip of material such as sheet metal into a plurality of narrower continuous strips which partially define the outline of circular blanks to be formed therefrom and which may be conveniently handled in coiled form for subsequent stamping operations.

Other objects and advantages of the present invention will be apparent from the following description and accompanying drawings wherein:

FIG. 2 represents an end view of the machine of FIG. 1;

FIG. 3 represents the rotatable slitting members removed from the machine of FIG. 1;

FIG. 4 represents the manner in which the metal strips are cut in serpentine form and the general outline of the circular backing plates stamped therefrom;

FIG. 5 represents a strip of sheet metal having longitudinal serpentine side portions and coiled about a reel for storage or handling;

FIG. 6 represents in schematic form the stamping process performed on the strips of sheet metal;

FIG. 7 represents a sectional view taken on line 7—7 of FIG. 6 showing the completed backing plate;

FIG. 8 represents a front view of the position sensing device of FIG. 6;

FIG. 9 represents a top view of the position sensing device of FIG. 6; and

Figure 1:
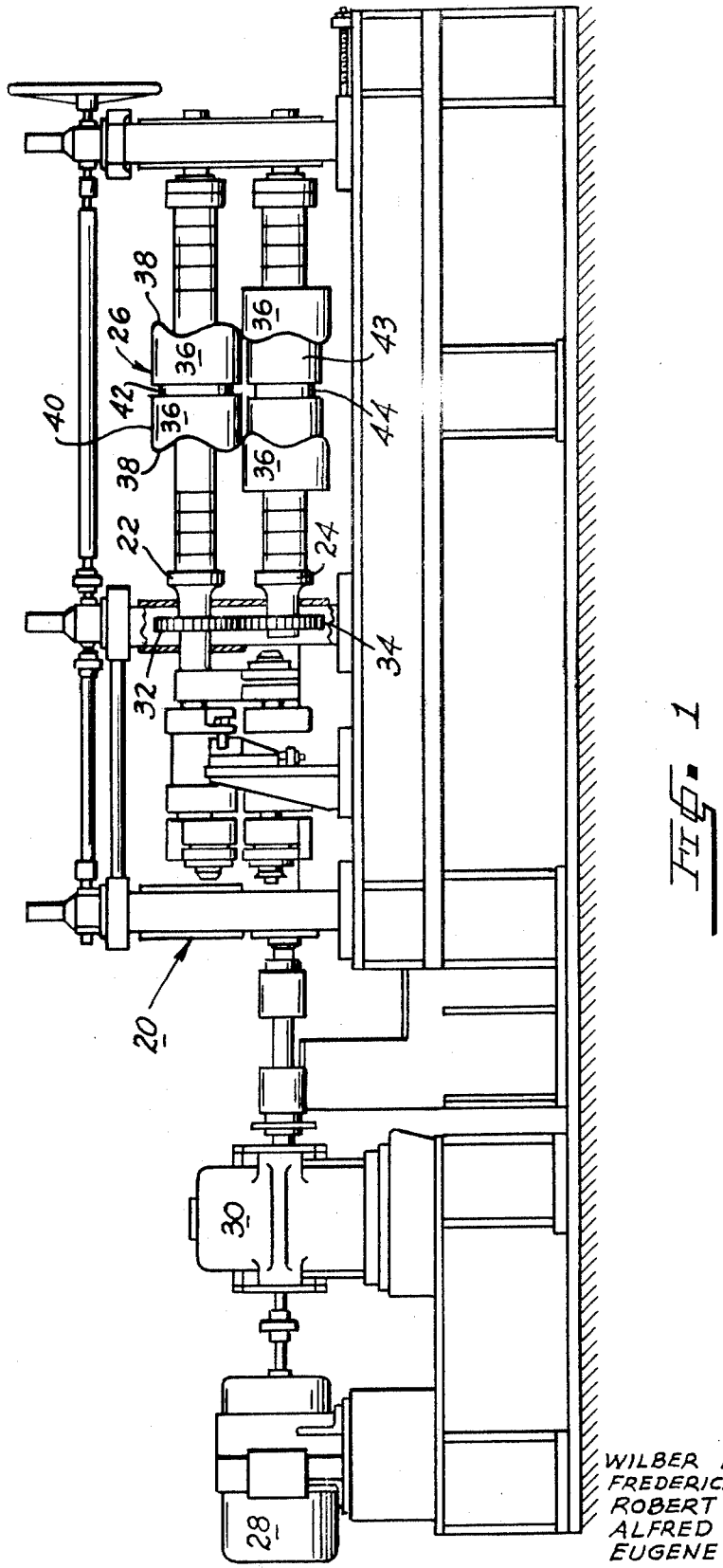
FIG. 1 represents a machine embodying the present invention for slitting a sheet of metal.

Referring to the drawings and FIGS. 1 and 2 in particular, numeral 20 represents, in general, a machine of conventional design which is suited to drive arbors 22 and 24, upon which applicants' cutter mechanism, generally indicated by 26, is mounted for rotation. The machine 20, being of conventional design is therefore shown somewhat schematically and includes a motor 28 which, through a gear reduction unit 30, provides power for driving the arbors 22 and 24 which are rotationally synchronized through gears 32 and 34.

A rotary cutter 36 is provided with a serpentine or sinuous cutting edge 38. An upper cutter 40 is defined by a pair of the rotary cutters 36 arranged back-to-back and suitably secured to arbor 22 for rotation therewith. One or more spacing members 42 interposed between the rotary cutters 36 serves to position the cutters 36 in spaced relation on arbor 22, thereby establishing the effective width of cut of upper cutter 40. The upper cutter 40 is adapted to coact with a lower cutter 43 suitably secured to arbor 24 for rotation therewith. The lower cutter 43 is defined by a pair of rotary cutters 36 arranged in longitudinal spaced relationship on arbor 24 by means of one or more spacing members 44 so as to enable the serpentine cutting edges 38 thereof to properly coact with the cutting edges 38 of upper cutter 40, thereby shearing a sheet of metal 46 passed therebetween accordingly into three separate strips 48, 50 and 52.

The sheet metal 46 is supplied in coiled form as indicated by 53 and fed between cutters 40 and 43 by suitable conventional feed mechanism 54. After passing between cutters 40 and 43, the separated sections 48, 50 and 52 are rolled upon separate reels 56, one of which is shown in FIG. 5 with the center section 50 coiled thereon. The reel 56 is suitably mounted adjacent a conventional stamping press, not shown, upon which are mounted the various dies including die 58 for stamping the backing plate to form. The section 48, for example, is fed from its associated reel 56 and guided into the first station die generally indicated by 58 in FIG. 6. A position sensing device generally indicated by 60, mounted on die 58 adjacent the section 48, is adapted to engage the outwardly extending curved edge portions of section 48 as the latter passes through the die 58 to positively locate the center of curvature thereof relative to the die 58.

The section 48 passes through die 58 which prepares the section 48 for the drawing operations by stamping portions 62 and 64, central opening 66 and portions 68 and 70 therefrom as shown in the shaded areas in FIGURE 6 to provide relatively narrow V-shaped connecting strips 72 and 74 between adjacent sections 76 from which the backing plate 78 is formed. The section 48 is suitably guided by guide 79 as section 48 passes through die 58. The metal between portions 72 and 74 is severed as indicated at 80. Since the progressive forming operations performed on the backing plate 78 by the dies, not shown, following die 58 result in a progressive separation of one backing plate 78 from the following backing plate 78, it will be recognized that the V-shaped connecting strips 74 and 76 compensate for such separation by stretching toward a straight position, thereby maintaining the center-to-center distance between adjacent backing plates 78 constant throughout the forming operation. Upon reaching the final stamping stage generally indicated by 82, the backing plate 78 is stamped from its associated backing plate 78 in the form indicated by FIG. 7 and removed leaving relatively narrow rings 84 connected by strips 72 and 74 of scrap which are subsequently cut into smaller sections as desired by suitable shearing means, not shown, for disposal.

It will be recognized that the strip 50 differs from strips 48 and 52 in that both sides of the former, the one side being indicated in dashed form at 86 in FIG. 6, are cut in a serpentine pattern whereas strips 48 and 52 have only one side cut to a serpentine pattern. In the case of strip 50, the die 58 through which the strip 50 is processed is modified accordingly from that shown in FIG. 6 to provide a second stamped portion 68 in place of stamped portion 70.

Figure 10:
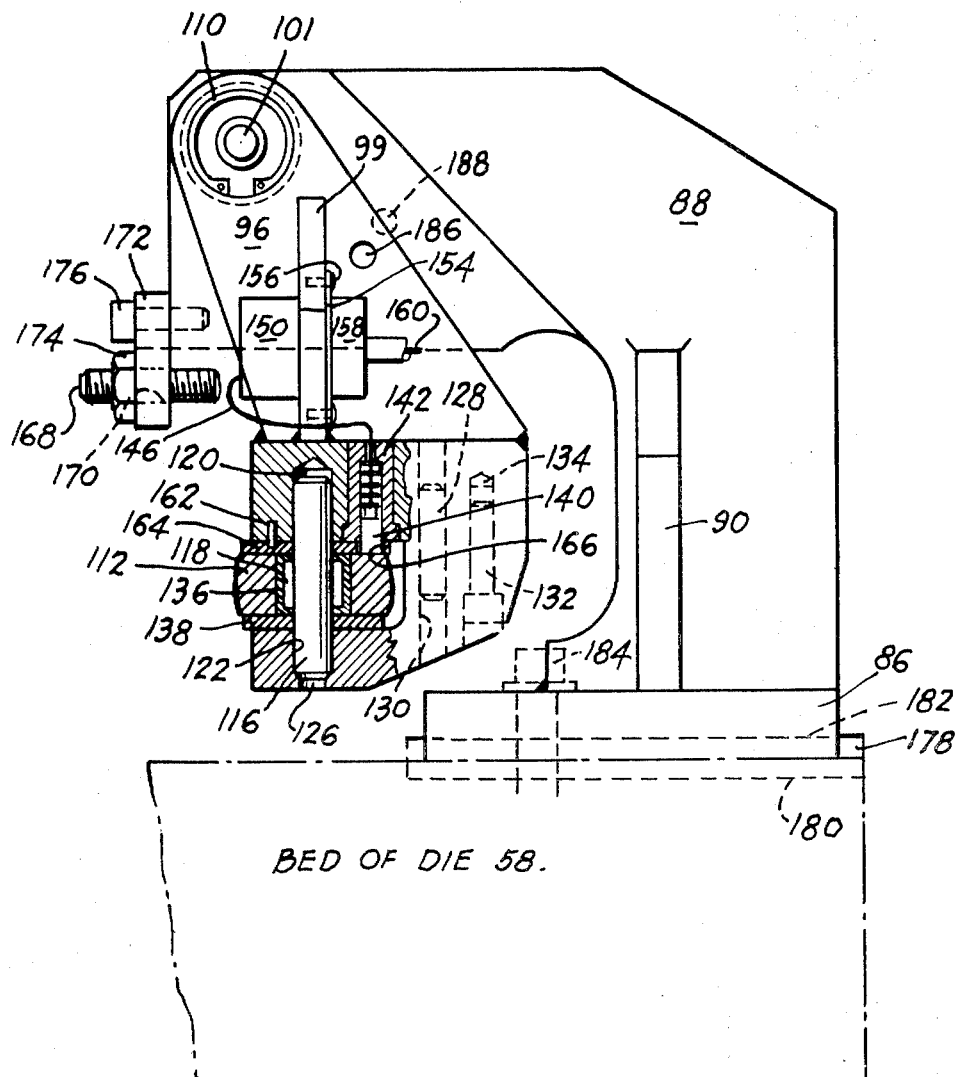
FIG. 10 represents a side view in partial section of the position sensing device of FIG. 6.

Referring to FIGS. 8, 9 and 10, the position sensing device 60 is shown in a preferred form. The device 60 includes a flat base 86 and an upstanding support arm 88 fixedly secured to the midsection thereof by brackets 90 and 92 which are fastened in position by any suitable means such as welds. A support member having spaced apart parallel arms 94 and 96 fixedly secured to a cross member such as rectangular plate 98 by brackets 99 and 100 which are fastened in position by suitable means, such as welds, is journaled for pivotal movement on a shaft 101 secured in bore 102 of arm 88 by a set screw 104 threadedly engaged with arm 88. Antifriction bearings 106 and 108 suitably carried in arms 94 and 96, respectively, and secured in position by associated snap rings 110 are supported by opposite end portions of shaft 101, thereby permitting substantially unrestricted pivotal movement of arms 94 and 96 and plate 98 about the axis of shaft 101.

A pair of spaced apart rollers 112 and 114 made of any suitable electric current conducting material, such as steel, are journalled on associated spaced apart parallel shafts 116 by means of roller bearings 118. The shafts 116 are supported at one end in associated blind bores 120 formed in plate 98 and, at the opposite end, in associated bores 122 formed in a plate 123 having notched portions 124 to accommodate the rollers 112 and 114. The shafts 116 are held in position axially by reduced diameter end portions 126 of bores 122. One or more locating pins 128 carried by plate 98 or 123 is adapted to mate with openings 130 formed in the adjacent plate. A plurality of bolts 132 extend through plate 123 into engagement with threaded openings 134 in plate 98 thereby holding plates 98 and 123 together in fixed relative positions. A ring 136 of suitable insulating material such as nylon interposed between rollers 112 and 114 and associated bearings 118 abuts washers 138 of similar insulating material interposed between rollers 112 and 114 and adjacent plates 98 and 123. The ring 136 and washers 138 serve to insulate electrically the rollers 112 and 114 from adjoining plates 98 and 123 for a purpose to be described. A carbon brush 140, slidably carried in a cylindrical brush holder 142 of suitable material to insulate electrically brush 140 from plate 98, the latter being bored to receive holder 142, slidably engages each associated roller 112 and 114. A spring 144 bears against each brush 140, thereby urging the same into contact with associated roller 112 or 114. An electric current conducting wire 146 secured to each brush 140 extends through an opening 148 in holder 142 and is connected to the terminal of an associated socket 150, which is carried in an opening 152 in associated bracket 99 or 100. A flange 154 integral with socket 150 is secured to associated bracket 99 or 100 by screws 156 threadedly engaged with the latter. A plug 158 removably secured to socket 150 is provided with conducting wire 160.

A locating pin 162 secured to plate 98 engages a mating opening 164 in an associated washer 138, thereby locating a hole 166 in the latter with respect to the carbon brush 140 which extends through hole 166 into engagement with the associated roller 112 or 114.

The pivotal movement of arms 94 and 96, as well as rollers 112 and 114 movable therewith, is limited in a clockwise direction, as viewed in FIG. 10, by an adjustable stop member 168 threadedly engaged with an opening 170 in a bracket 172 and locked in position therein by a lock nut 174. The bracket 172 is removably secured to support arm 88 by bolts 176 threadedly engaged with arm 88.

The base 86 is aligned relative to die 58 in a predetermined position by means of an elongated key 178 which mates with slots 180 and 182 formed in base 86 and the bed of die 58, respectively. Bolts 184 extend through base 86 into threaded engagement with the bed of die 58 in any suitable manner permitting adjustment of base 86 toward or away from the die 58 and are tightened to lock the base 86 in position. The longitudinal axis of key 178 lies in a plane perpendicular to the longitudinal axis $x$—$x$ of die 58 and passing through center A thereof, as shown in FIG. 6. The rollers 112 and 114 are arranged on opposite sides of key 178 with the axes thereof substantially equidistantly spaced from the longitudinal axes of key 178 as, for example, within a tolerance of .005 inch.

Openings 186 in arms 94 and 96 are adapted to be aligned with opening 188 in support arm 88 when the arm 88 is pivoted counterclockwise from the position shown in FIG. 10. A pin, not shown, may be inserted through openings 186 and 188 to thereby hold the arms 94 and 96 in a retracted position where the rollers 112 and 114 are out of engagement with the sheet metal section 48.

As shown in FIG. 9, the freely pivotable arms 94 and 96 are adapted to carry rollers 112 and 114 into and out of engagement with the convex portions of sections 76 as the sheet metal section 48 passes through die 58. The rollers 112 and 114 are prevented from engaging the concave portion of section 48 by the stop member 168 which is suitably adjusted to engage arm 96. Assuming the section 76 to be in the proper position for the stamping operation where the center of radius of curvature of section 76 and the center A of die 58 are aligned, the rollers 112 and 114 contact the edge portion of section 76 which, together with rollers 112 and 114, completes an electric circuit between conducting wires 160. The wires 160 are connected to conventional electrical control mechanisms suitably connected to start and/or stop the movement of the press, not shown. Completion of the circuit in the abovementioned manner produces an electrical input signal to the control mechanism of the press indicating proper positioning of the section 48 in the die 58 which, in turn, allows the press to complete its stamping cycle. If desired, a light, not shown, installed in the usual control panel associated with the conventional press may be wired in series with one of the wires 160 to provide a corresponding visual indication to the press operator that the section 48 is properly positioned.

In the event that the section 76 is improperly positioned longitudinally in die 58 as, for example, not centrally located with respect to A, the convex portion of section 76 will lie off center with respect to the rollers 112 and 114. In such a case, only one roller 112 or 114, depending on the direction of longitudinal position error of section 76, will engage the convex edge portion of section 76 which results in not completing the electric circuit through rollers 112 and 114 which, in turn, signals the control mechanism of the press that correction is in order. The press movement is halted accordingly until the section 76 is properly aligned longitudinally in die 58 whereupon the stamping cycle is restarted.

As shown in FIG. 9, only one sensing device 60 is shown. However, as a practical arrangement, a sensing device 60 may be located on each side of the die 58 and the strip 48, 50 or 52 passed therebetween. In the processing of strip 48 or 52, the sensing device 60 may be locked in retracted position by inserting the pin, not shown, into openings 186 and 188 so that the associated rollers 112 and 114 are held out of contact with the straight edge of strip 48 or 52.

It will be understood that the above described method of slitting sheet metal is not restricted to brake backing plates since the strips 48, 50 or 52 with serpentine longitudinal edges may be utilized in forming circular blanks which may or may not be stamped to a desired form with a corresponding saving in material scrap.

Various changes and modifications in the structure shown and described may be made by those persons skilled in the appropriate art without departing from the scope of applicants' invention as defined by the following claims.

We claim:
1. Position sensing apparatus for determining the position of an electric current conducting member relative to a fixed reference such as sheet metal being processed in a series of progressive stamping dies, said apparatus comprising:
   a support member fixedly secured adjacent one of the dies;
   a pair of spaced apart electric current conducting members mounted on said support member and connected in series in an electric control circuit;
   said pair of spaced apart members being mounted on said support member for movement relative to the fixed reference into engagement with the electric current conducting member which, if properly positioned relative to said fixed reference, is engaged by both of said members to thereby complete that portion of said electric control circuit between said spaced apart members.

2. Position sensing apparatus as claimed in claim 1 wherein said pair of spaced apart electric current conducting members are rollers rotatably carried by a second support member pivotally secured to said first named support member;
   said rollers rotating on axes perpendicular to the axis about which said second support member pivots.

3. Position sensing apparatus as claimed in claim 2 wherein each of said rollers are engaged by an associated electric current conducting member slidably engaged therewith.

4. Position sensing apparatus as claimed in claim 2 and further including means removably secured to said first named support member and said second support member for holding said second support member out of engagement with said electric current conducting member thereby rendering said position sensing apparatus inoperative.

References Cited

UNITED STATES PATENTS

| | | | |
|---|---|---|---|
| 3,190,527 | 11/1963 | Sisson | 192—125 |
| 3,282,074 | 11/1966 | Gardner | 72—31 |
| 3,381,559 | 5/1968 | Letever et al. | 83—61 |

RICHARD J. HERBST, Primary Examiner

U.S. Cl. X.R.

72—361; 83—66